(12) United States Patent
Muto et al.

(10) Patent No.: US 12,441,398 B2
(45) Date of Patent: Oct. 14, 2025

(54) WORK VEHICLE STEERING CONTROL APPARATUS

(71) Applicant: KABUSHIKI KAISHA AICHI CORPORATION, Saitama (JP)

(72) Inventors: Osamu Muto, Konosu (JP); Kunihiro Mori, Ageo (JP)

(73) Assignee: KABUSHIKI KAISHA AICHI CORPORATION, Saitama (JP)

( * ) Notice: Subject to any disclaimer, the term of this patent is extended or adjusted under 35 U.S.C. 154(b) by 559 days.

(21) Appl. No.: 17/934,529

(22) Filed: Sep. 22, 2022

(65) Prior Publication Data

US 2023/0101102 A1  Mar. 30, 2023

(30) Foreign Application Priority Data

Sep. 30, 2021 (JP) .................................. 2021-160393

(51) Int. Cl.
*B62D 7/15* (2006.01)

(52) U.S. Cl.
CPC ........... *B62D 7/159* (2013.01); *B62D 7/1581* (2013.01)

(58) Field of Classification Search
CPC ...... B62D 7/159; B62D 7/1581; B62D 6/002; B62D 7/142; B62D 7/1509
See application file for complete search history.

(56) References Cited

U.S. PATENT DOCUMENTS

| | | | | |
|---|---|---|---|---|
| 4,315,555 A | * | 2/1982 | Schritt ................. | B62D 7/1509 180/403 |
| 5,996,722 A | * | 12/1999 | Price ................... | B60G 17/0152 180/234 |
| 6,488,113 B1 | * | 12/2002 | Worpell ................ | B62D 7/148 701/41 |

(Continued)

FOREIGN PATENT DOCUMENTS

| | | |
|---|---|---|
| JP | 2006069444 A * | 3/2006 |
| JP | 2020-006905 A | 1/2020 |

OTHER PUBLICATIONS

The extended European search report issued by the European Patent Office on Feb. 20, 2023, which corresponds to European Patent Application No. 22198152.5-1009 and is related to U.S. Appl. No. 17/934,529.

*Primary Examiner* — Drew J Brown
(74) *Attorney, Agent, or Firm* — Studebaker Brackett PLLC

(57) ABSTRACT

A work vehicle steering control apparatus comprises a vehicle body (11), front wheels and rear wheels both of which can be steered respectively; a front-wheel steering cylinder (92) and a rear-wheel steering cylinder (94); a steering dial (72); a steering actuation controller (50); and a steering angle detector. The steering actuation controller (50) is configured in a manner such that when a steering operation is performed, and when the steering angles of one set of wheels are less than a predetermined angle ($\theta_1$), the controller (50) controls the steering actuator to steer only the (Continued)

one set of wheels in response to the directional-change steering operation. When the steering angles of the one set of wheels are equal to or more than the predetermined angle, the controller (50) controls the steering actuator to steer the other set of wheels in a direction opposite to steering direction.

5 Claims, 7 Drawing Sheets

(56) References Cited

U.S. PATENT DOCUMENTS

| | | | |
|---|---|---|---|
| 6,827,176 B2 * | 12/2004 | Bean | B60K 17/356 |
| | | | 180/906 |
| 9,096,127 B2 * | 8/2015 | Matsuzaki | B60W 10/06 |
| 10,625,770 B2 | 4/2020 | Brooks et al. | |
| 11,912,360 B2 * | 2/2024 | Okano | B62D 7/159 |
| 2007/0131473 A1 * | 6/2007 | Jonasson | B62D 15/0265 |
| | | | 180/408 |
| 2014/0074340 A1 * | 3/2014 | Wilson | A01B 69/008 |
| | | | 701/25 |
| 2015/0012181 A1 * | 1/2015 | Brunnert | A01B 69/007 |
| | | | 701/41 |
| 2016/0318465 A1 * | 11/2016 | Brooks | F16H 61/448 |
| 2016/0318550 A1 * | 11/2016 | Brooks | B62D 15/025 |
| 2024/0278829 A1 * | 8/2024 | Morino | B62D 6/02 |

* cited by examiner

WORK VEHICLE STEERING CONTROL APPARATUS

TECHNICAL FIELD

The present invention relates to a steering control apparatus for a work vehicle that can change a traveling direction by steering front wheels and rear wheels.

TECHNICAL BACKGROUND

As examples of work vehicles having a steering control apparatus that can change a traveling direction by steering front wheels and rear wheels, a so-called self-propelled vehicle with an aerial work platform and a self-propelled excavation vehicle and the like are known. They are widely used for civil engineering and construction work, shipbuilding work, and the like. The self-propelled vehicle is provided with a boom or scissors-link type lifting apparatus and a work platform supported and moved up and down by the lifting apparatus on a vehicle body. The self-propelled excavation vehicle is provided with an excavating apparatus on a vehicle body. Such work vehicles are configured to automatically apply a brake for restricting the wheels from rotating when the vehicle is stationary so that work at heights and the like can be performed safely. Moreover, the vehicles are configured to release the brake actuation when a traveling operation is performed, and also to drive the wheels into rotation on the basis of the traveling operation so that the vehicles can travel and move.

Such work vehicles as mentioned above include a two-wheel steering work vehicle that actuates either the front wheels or the rear wheels provided on the front, rear, left, and right of the vehicle body to turn to change a traveling direction, and a four-wheel steering work vehicle that actuates both the front wheels and the rear wheels to turn to change a traveling direction. In addition, some four-wheel steering work vehicles are known as a work vehicle configured to be switchable between a two-wheel steering mode and a four-wheel steering mode (for example, see Japanese Laid-Open Patent Publication No. 2020-6905(A)). It should be noted that the four-wheel steering modes include a steering mode in which the front wheels and the rear wheels turn in opposite lateral directions (also referred to as "counter-phase four-wheel steering mode"), and a steering mode in which the front wheels and the rear wheels turn in the same lateral direction (also referred to as "in-phase four-wheel steering mode").

SUMMARY OF THE INVENTION

Problems to be Solved by the Invention

In the work vehicle configured to be switchable between the two-wheel steering mode and the counter-phase four-wheel steering mode, the counter-phase four-wheel steering mode is selected mainly when it is desired to reduce a turning radius of the vehicle, whereas the two-wheel steering mode is selected in a normal case where such a necessity does not arise. In conventional work vehicles, switching between the two-wheel steering mode and the counter-phase four-wheel steering mode is performed by an operator operating a selector switch or the like. Therefore, in such a case where the operator selects the two-wheel steering mode and steers, and simultaneously starts rotational travel of the vehicle, but in the process the operator desires to reduce the turning radius of the vehicle, the operator is required to interrupt steering and the like and operate the selector switch or the like to switch from the two-wheel steering mode to the counter-phase four-wheel steering mode, and accordingly a reduction in operability during steering is problematic.

The present invention has been made in view of these circumstances, and an object thereof is to provide a work vehicle steering control apparatus that enables improvement in operability during steering of a work vehicle having steerable front and rear wheels.

Means to Solve the Problems

In order to solve the problem described above, in accordance with an embodiment of the present invention, a work vehicle steering control apparatus comprises a vehicle body (for example, a traveling body frame 11 in an embodiment), front wheels rotatably provided at left and right sides of front part of the vehicle body and rear wheels rotatably provided at left and right sides of rear part of the vehicle body, the front wheels and the rear wheels being able to be steered respectively; a steering actuator (for example, a front-wheel steering cylinder 92 and a rear-wheel steering cylinder 94 in the embodiment) for steering the front wheels and/or the rear wheels to turn the work vehicle; a steering operation device (for example, a steering dial 72 in the embodiment) for performing a steering operation of the front wheels and the rear wheels; a steering actuation control device (for example, a controller 50 in the embodiment) for controlling actuation of the steering actuator on the basis of the steering operation performed by the steering operation device; and a steering angle detector for detecting steering angles of the front wheels and the rear wheels. The steering actuation control device is configured in a manner such that when a directional-change steering operation for changing a vehicle traveling direction is performed by the steering operation device, on the basis of a detection result from the steering angle detector, when the steering angles of one set of wheels of either the front wheels and the rear wheels are less than a predetermined angle (for example, $\theta_1$ in the embodiment), the steering actuation control device controls the steering actuator to steer only the one set of wheels of the front wheels and the rear wheels to turn the work vehicle in response to the directional-change steering operation, and when the steering angles of the one set of wheels are equal to or more than the predetermined angle, the steering actuation control device controls the steering actuator to steer the other set of wheels of the front wheels and the rear wheels in a direction opposite to steering direction of the one set of wheels in response to the directional-change steering operation.

In the steering control apparatus thus configured, it is preferred that the predetermined angle is a maximum steering angle of the one set of wheels.

In the steering control apparatus thus configured, a detection switch for detecting that the steering angles of the one set of wheels reach the maximum steering angle may be included instead of the steering angle detector.

In the steering control apparatus thus configured, it is preferred that the steering actuation control device be configured in a manner such that when a return steering operation for turning the front wheels and the rear wheels toward a neutral position is performed by the steering operation device after the directional-change steering operation is performed by the steering operation device, on the basis of a detection result from the steering angle detector, when the steering angles of the other set of wheels do not reach a steering angle in the neutral position, the steering actuation control device controls the steering actuator to actuate only the other set of wheels to turn in response to the return steering operation, and when the steering angles of the other set of wheels reach the steering angle in the neutral position, the steering actuation control device controls the steering actuator to actuate only the one set of wheels to turn in a direction opposite to the other set of wheels while retaining the other set of wheels in the neutral position in response to the return steering operation.

Advantageous Effects of the Invention

In accordance with the steering control apparatus according to the present invention, when the directional change steering operation for changing the vehicle traveling direction is performed, and when the steering angles of one set of wheels of front wheels and rear wheels are less than a predetermined angle, only the one set of wheels are actuated to turn in response to the directional change steering operation, and when the steering angles of the one set of wheels are equal to or more than the predetermined angle, the other set of wheels of the front wheels and the rear wheels are actuated to turn in the direction opposite to the one set of wheels in response to the directional change steering operation. Accordingly, a steering mode in which only the one set of wheels are turned in response to the directional change steering operation and a steering mode in which the other set of wheels are also turned in response to the directional change steering operation can be smoothly switched by simply performing the directional change steering operation. Therefore, operability during the directional change steering operation can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE EMBODIMENTS

Figure 1:
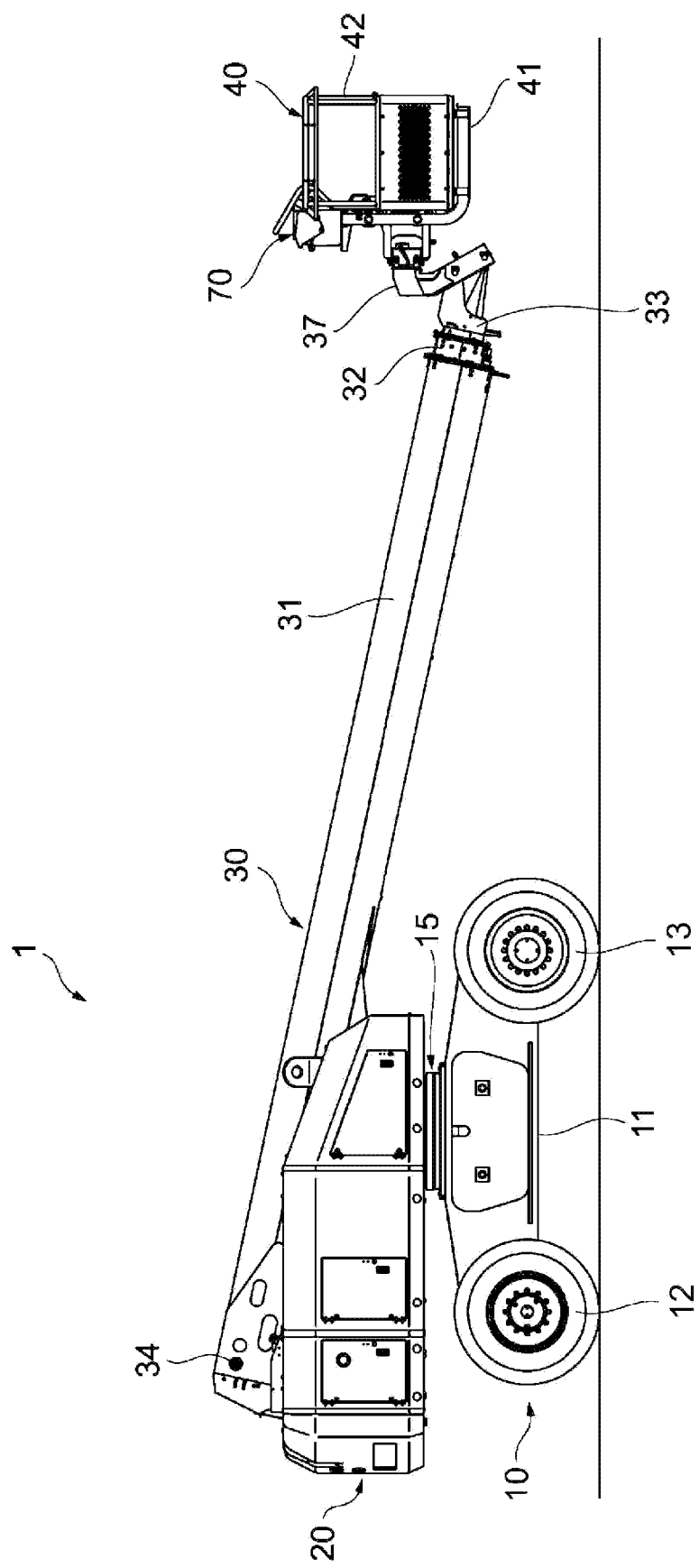
FIG. 1 is a side view of a self-propelled vehicle with an aerial work platform as an example of a work vehicle provided with a steering control apparatus according to the present invention.
Figure 2:
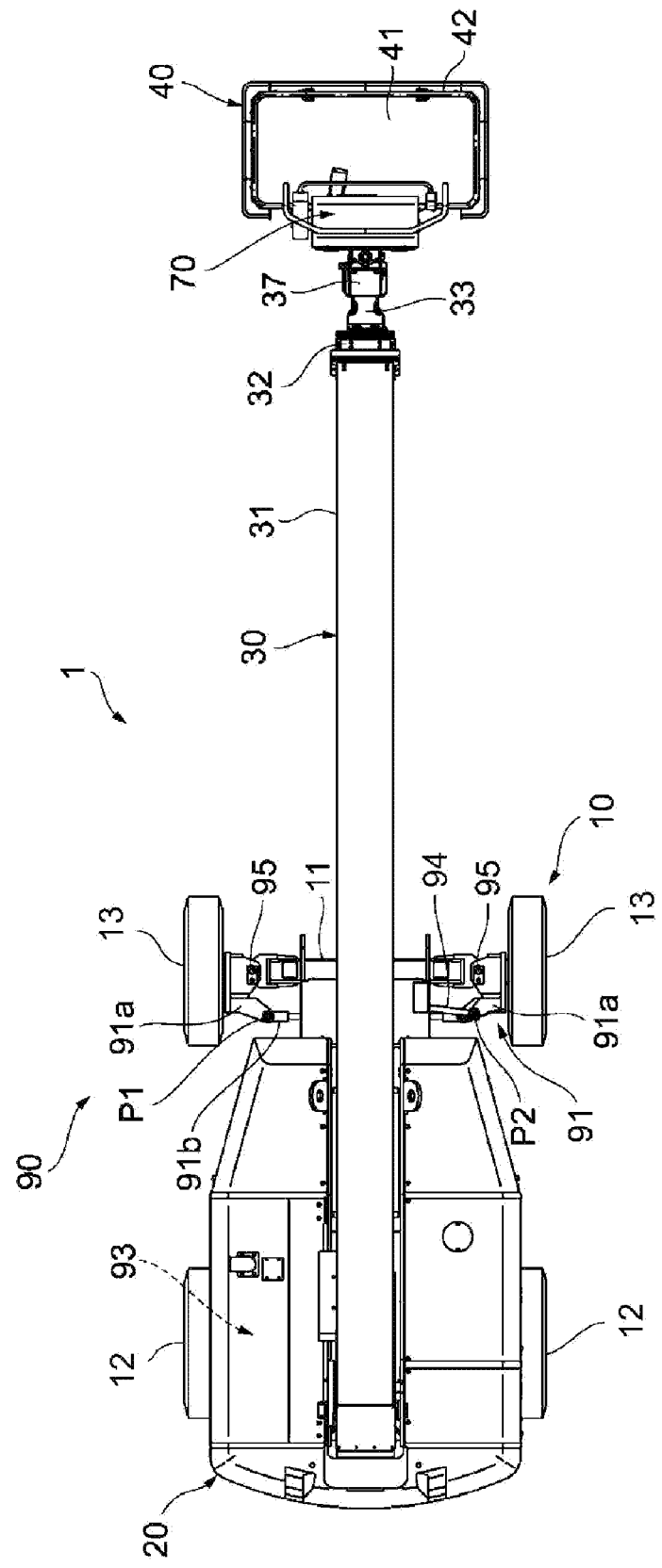
FIG. 2 is a top view of the vehicle with an aerial work platform.

An embodiment of the present invention will be described below with reference to the drawings. A self-propelled vehicle with an aerial work platform 1 is shown in FIGS. 1 and 2 as an example of a work vehicle provided with a steering control apparatus according to the present invention. The vehicle with an aerial work platform 1 includes a traveling body 10 configured to be travelable, a rotating body 20 provided horizontally rotatably on top of the traveling body 10, a boom 30 provided vertically swingably on top of the rotating body 20, and a work platform 40 provided at a distal end of the boom 30.

The traveling body 10 has a pair of left and right front wheels 12 and a pair of left and right rear wheels 13 provided rotatably on a traveling body frame 11. The traveling body 10 has two front-wheel travel motors 16 (see FIG. 3) for driving the respective left and right front wheels 12 into rotation, and two rear-wheel travel motors 17 (see FIG. 3) for driving the respective left and right rear wheels 13 into rotation. The traveling body 10 is configured to be travelable and movable in a desired direction by the front-wheel and rear-wheel travel motors 16, 17 driving into rotation the left and right front wheels 12 and rear wheels 13, respectively, and simultaneously by steering these respective front wheels 12 and rear wheels 13.

A rotation mechanism 15 is provided centrally on top of the traveling body frame 11. The rotation mechanism 15 has an outer ring fixed to the traveling body frame 11, an inner ring fixed to the rotating body 20 and engaged with the outer ring, a rotation motor 26 (see FIG. 3) provided on the rotating body 20, and a rotary center joint for supplying a hydraulic fluid from a hydraulic pump P (see FIG. 3) provided on the rotating body 20 to the front-wheel and rear-wheel travel motors 16, 17 and the like provided on the traveling body 10. The rotating body 20 is horizontally rotatably mounted to the traveling body frame 11 via the rotation mechanism 15, and configured to be rotatable leftward and rightward relative to the traveling body 10 by actuating the rotation motor 26 to rotate forward or in reverse.

The boom 30 is vertically swingably provided on top of the rotating body 20 via a pivotally-connecting pin 34. The boom 30 can be actuated to vertically swing relative to the rotating body 20 by a boom vertical swing cylinder 35 (see FIG. 3) provided in a bridging manner between the rotating body 20 and the boom 30. The boom 30 has a base boom 31 connected pivotally to the rotating body 20, and an intermediate boom 32 and a top boom 33 combined with the base boom 31 in a telescopic form, and is configured to be axially extendable. The boom 30 can be actuated to axially extend and contract by a boom axial extension cylinder 36 (see FIG. 3) provided in the boom 30.

A vertical post 37 is vertically swingably provided at a distal end of the top boom 33 via a pivotally-connecting pin. The work platform 40 is provided so as to be rotatable leftward and rightward (horizontally swingable) on top of the vertical post 37. An upper leveling cylinder (not shown) is provided in a bridging manner between the distal end of the top boom 33 and the vertical post 37. A hydraulic hose forms a closed circuit between this upper leveling cylinder and a lower leveling cylinder (not shown) provided in a bridging manner between the base boom 31 and the rotating body 20, and the upper leveling cylinder is configured to be actuated to axially extend and contract in response to axial extension and contraction of the lower leveling cylinder, thereby swinging the vertical post 37 vertically relative to the top boom 33 to keep a floor surface of the work platform 40 horizontal at all times regardless of a vertical swing angle of the boom 30.

The work platform 40 is configured to be actuatable to rotate leftward and rightward (horizontally swing) relative to the vertical post 37 by a swing motor 46 (see FIG. 3) provided on the work platform 40. The work platform 40 has a substantially rectangular working floor 41 a worker can get onto, and a handrail 42 erected around the work platform 41. An operation device 70 for performing a traveling operation of the traveling body 10, an actuation operation of the boom 30, and the like provided on the work platform 40.

Figure 3:
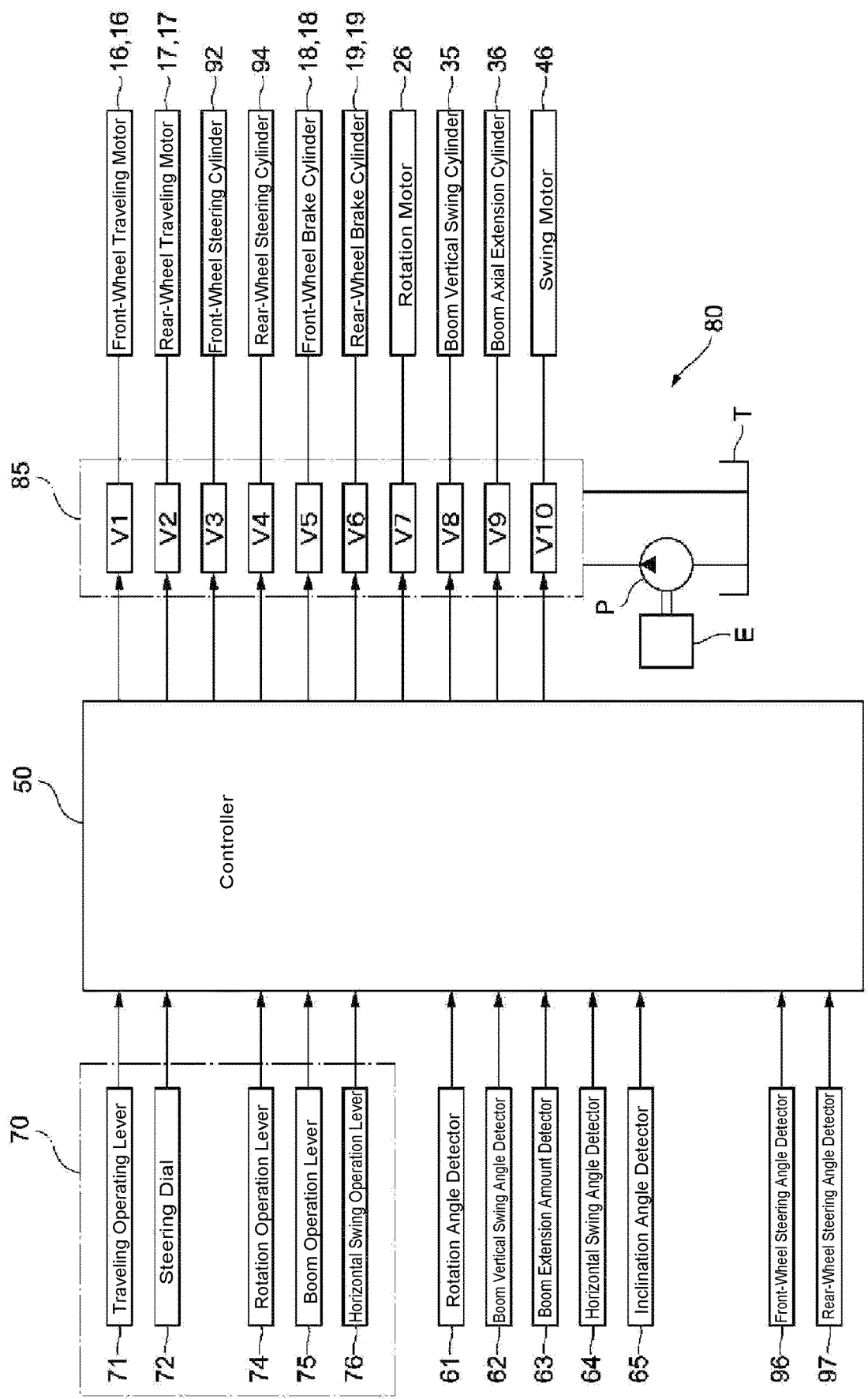
FIG. 3 is a block diagram illustrating an actuation control configuration of the vehicle with an aerial work platform.

The operation device 70, as shown in FIG. 3, has a traveling operation lever 71 for switching between start and stop and between forward movement and reverse movement of the traveling body 10, and the like, a steering dial 72 for performing a steering operation of the traveling body 10 (steering of the front wheels 12 and the rear wheels 13), a rotation operation lever 74 for performing a rotating operation of the rotating body 20, a boom operation lever 75 for performing vertical swing and axial extension operations of the boom 30, and a horizontal swing operation lever 76 for performing a swing operation (rotation operation) of the work platform 40. Each of the operation levers of the operation device 70 is situated in a neutral position where the operation levers are in a vertical attitude when the lever is not operated, and is configured to be operable to tilt in each direction relative to this neutral position. The vehicle with an aerial work platform 1 is configured in a manner such that a worker can get onto the work platform 40 and can operate the traveling operation lever 71, the steering dial 72, and the like, thereby causing the vehicle with an aerial work platform 1 to travel and move to a desired working position, and can also operate the rotation operation lever 74, the boom operation lever 75, and the like, thereby moving the work platform 40 up and down to a desired height position.

The left and right front wheels 12 and rear wheels 13 and the steering dial 72 are interlockingly connected to each other via a steering device 90. The steering device 90, as shown in FIGS. 2 and 3, has a front-wheel turning mechanism 93 connected to the left and right front wheels 12, a front-wheel steering cylinder 92 for driving the front-wheel turning mechanism 93 to change steering angles of the left and right front wheels 12 (a deflection angle of the front wheel 12 relative to a longitudinal central axis of the traveling body 10), a rear-wheel turning mechanism 91 connected to the left and right rear wheels 13, a rear-wheel steering cylinder 94 for driving the rear-wheel turning mechanism 91 to change steering angles of the left and right rear wheels 13 (a deflection angle of the rear wheel 13 relative to the longitudinal central axis of the traveling body 10), a front-wheel steering angle detector 96 for detecting the steering angles of the left and right front wheels 12, and a rear-wheel steering angle detector 97 for detecting the steering angles of the left and right rear wheels 13.

The rear-wheel turning mechanism 91 has a pair of left and right rear-wheel knuckle arms 91a supporting the left and right rear wheels 13 swingably around respective rear-wheel kingpin pivots 95, and a rear-wheel tie rod 91b connecting the left or right rear-wheel knuckle arms 91a via respective connecting pins P1. The rear-wheel steering cylinder 94 has one end connected to the right rear-wheel knuckle arm 91a via a connecting pin P2, and has the other end connected to a cylinder connecting portion (not shown) of the traveling body frame 11 via a connecting pin. The steering device 90 is configured to actuate the rear-wheel steering cylinder 94 to extend and contract axially, thereby swinging the right rear wheel 13 around the rear-wheel kingpin pivot 95, and swinging the left rear wheel 13 via the rear tie rod 91b at the same time and in the same direction as the right rear wheel 13 so that the steering angles of the left and right rear wheels 13 can be changed.

The front-wheel turning mechanism 93 is configured similarly to the rear-wheel turning mechanism 91 described above. Though not shown, the front-wheel turning mechanism 93 has a pair of left and right front-wheel knuckle arms supporting the left and right front wheels 12 swingably around a front-wheel kingpin pivot, and a front-wheel tie rod connecting the left and right front-wheel knuckle arms via a connecting pin. The front-wheel steering cylinder 92 has one end connected to the right front-wheel knuckle arm via a connecting pin, and has the other end connected to a cylinder connecting portion of the traveling body frame 11 via a connecting pin. The steering device 90 is configured to actuate the front-wheel steering cylinder 92 to extend and contract axially, thereby swinging the right front wheel 12 around the front-wheel kingpin pivot, and swinging the left front wheel 12 via the front tie rod at the same time and in the same direction as the right front wheel 12 so that the steering angles of the left and right front wheels 12 can be changed.

The traveling body 10 is provided with two front-wheel brake cylinders 18 for braking respective rotations of the left and right front wheels 12, and two rear-wheel brake cylinders 19 for braking respective rotations of the left and right rear wheels 13. The front-wheel brake cylinders 18 are negative brakes (also see FIG. 4) that brake and lock rotations of motor shafts of the front-wheel travel motors 16 by forces of springs contained therein, thereby braking the rotations of the front wheels 12 when the front-wheel brake cylinders 18 are not supplied with the hydraulic fluid. The rear-wheel brake cylinders 19, similarly to the front-wheel braking cylinders 18, are negative brakes that brake and lock rotations of motor shafts of the rear-wheel travel motors 17 by forces of springs contained therein, thereby braking the rotations of the rear wheels 13 when the rear-wheel brake cylinders 19 are not supplied with the hydraulic fluid.

The rotating body 20 is provided with a hydraulic unit 80 for serving as a driving source for the left and right front-wheel travel motors 16, the left and right rear-wheel travel motors 17, the left and right front-wheel brake cylinders 18, the left and right rear-wheel brake cylinders 19, the front-wheel steering cylinder 92, the rear-wheel steering cylinder 94, the rotation motor 26, the boom vertical swing cylinder 35, the boom axial extension cylinder 36, the swing motor 46, and the like, and supplying these hydraulic actuators with the hydraulic fluid. The hydraulic unit 80 has an engine E, the hydraulic pump P driven by the engine E, a hydraulic fluid tank T, and a control valve unit 85 for controlling a supplying direction and a supply amount of the hydraulic fluid supplied from the hydraulic pump P to each of the hydraulic actuators. The control valve unit 85 has a plurality of control valves V1 to V10 provided so as to correspond to the respective oil hydraulic actuators.

The rotating body 20 is provided with a controller 50 into which an operation signal is inputted from the operation device 70 provided on the work platform 40. When the controller 50 receives an operation signal from the operation device 70, the controller 50 outputs a command signal corresponding to the operation signal to the control valve unit 85 of the hydraulic unit 80. For example, if an operation signal is inputted from the rotation operation lever 74 of the operation device 70 into the controller 50, the controller 50 outputs a command signal corresponding to a tilting operation direction and an operation amount of the rotation operation lever 74 of the rotation operation lever 74 to the rotation control valve V7 of the control valve unit 85 to control a spool moving direction and a valve opening position of the rotation control valve V7, thereby driving the rotation motor 26 to actuate the rotating body 20 to rotate relative to the traveling body 10.

When an operation signal is inputted from the boom operation lever 75 into the controller 50, the controller 50 outputs a command signal corresponding to a tilting operation direction and an operation amount of the boom operation lever 75 into the vertical swing and axial extension control valves V8, V9 of the control valve unit 85 to control a spool moving direction and a valve opening position of the vertical swing and axial extension control valves V8, V9, thereby driving the boom vertical swing cylinder 35 and the boom axial extension cylinder 36 to actuate the boom 30 to swing vertically and to extend and contract axially. In addition, when an operation signal is inputted from the horizontal swing operation lever 76 into the controller 50, the controller 50 outputs a command signal corresponding to a tilting operation direction and an operation amount of the rotation operation lever 74 to the swing control valve V10 of the control valve unit 85 to control a spool moving direction and a valve opening position of the swing control valve V10, thereby driving the swing motor 46 to actuate the work platform 40 to swing horizontally relative to the vertical post 37.

In order to perform actuation control of the rotating body 20, the boom 30, and the work platform 40 in this manner, the vehicle with an aerial work platform 1 has a rotation angle detector 61 for detecting a rotation angle of the rotating body 20 relative to the traveling body 10, a boom vertical swing angle detector 62 for detecting the vertical swing angle of the boom 30 relative to the rotating body 20, a boom extension amount detector 63 for detecting an extension amount of the boom 30, a horizontal swing angle detector 64 for detecting a horizontal swing angle (rotation angle) of the work platform 40 relative to the boom 30 (vertical post 37), and an inclination angle detector 65 for detecting an inclination angle of the traveling body frame 11 relative to a horizontal plane, and a detection signal from each of these detectors is inputted into the controller 50. The controller 50 constantly calculates and stores the moving position of the work platform 40 relative to the traveling body 10 on the basis of the detection signals from these respective detectors.

Figure 4:
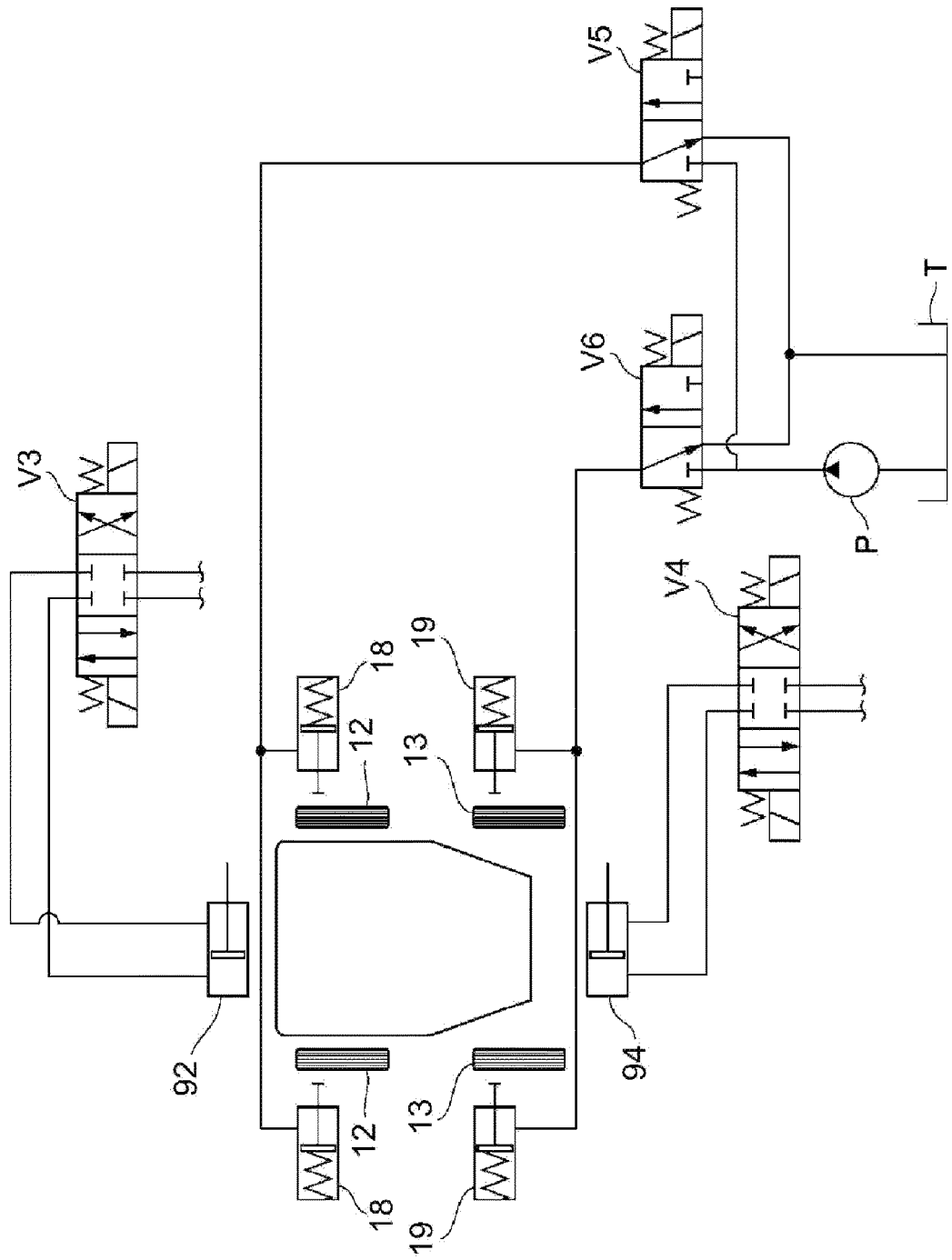
FIG. 4 is a hydraulic circuit diagram illustrating a part of a traveling control configuration of the vehicle with an aerial work platform.

Next, traveling control and steering control of the vehicle with an aerial work platform 1 (traveling body 10) will be described with additional reference to FIGS. 3 to 5. The traveling operation lever 71 is configured to be operable to tilt both frontward and rearward from the neutral position extending vertically, and outputs to the controller 50 an operation signal for setting a traveling direction and a target speed of the traveling body 10 according to a tilting operation direction and an operation amount from the neutral position. A frontward tilting operation of the traveling operation lever 71 is equivalent to a forward traveling signal of the traveling body 10, a rearward tilting operation thereof is equivalent to a reverse traveling signal of the traveling body 10, and a returning operation to the neutral position is equivalent to a stop signal of the traveling body 10. When an operation signal from the traveling operation lever 71 is inputted into the controller 50, the controller 50 outputs command signals corresponding to the operation signal to the front-wheel traveling control valve V1, the rear-wheel traveling control valve V2, the front-wheel brake control valve V5, and the rear-wheel brake control valve V6 of the traveling control valve unit 85 to control rotation actuation of the front-wheel travel motors 16, 16 and the rear-wheel travel motors 17, 17, namely driving of the front wheels 12, 12 and the rear wheels 13, 13.

When the traveling operation lever 71 is in the neutral position or operated to return from an operated-to-tilt state to the neutral position, and stops outputting the operation signal, the controller 50 stops outputting the command signals to the front-wheel traveling control valve V1 and the rear-wheel traveling control valve V2, thereby stopping the supply of the hydraulic fluid to the front-wheel travel motors 16, 16 and the rear-wheel travel motors 17, 17. Furthermore, when no operation signal is outputted, the controller 50, except during steering restriction, in principle, stops outputting the command signals to the front-wheel brake control valve V5 and the rear-wheel control valve V6. The front-wheel and rear-wheel brake control valves V5, V6 are each a three-port two-position solenoid operated directional control valve, and they shut off the supply of the hydraulic fluid from the hydraulic pump P to the front-wheel brake cylinders 18, 18 and the rear-wheel brake cylinders 19, 19 when outputting of the command signals from the controller 50 is stopped and the solenoids are put into a non-energized state. The left and right front-wheel and rear-wheel brake cylinders 18, 19 are each a negative brake, as mentioned above, and they brake and lock the rotations of the motor shafts of the front-wheel travel motors 16, 16 and the rear-wheel travel motors 17, 17 when the supply of the hydraulic fluid is stopped, thereby braking the rotations of the front wheels 12, 12 and the rear wheels 13, 13.

When the traveling operation lever 71 is operated to tilt frontward or rearward from the neutral position and a forward or reverse traveling signal is inputted into the controller 50, the controller 50 outputs command signals to the front-wheel brake control valve V5 and the rear-wheel brake control valve V6. When the solenoids are energized by the command signals from the controller 50, the front-wheel and rear-wheel brake control valves V5, V6 supply the hydraulic fluid from the hydraulic pump P to the front-wheel brake cylinders 18, 18 and the rear-wheel brake cylinders 19, 19, respectively. Upon receiving the supply of the hydraulic fluid, the left and right front-wheel and rear-wheel brake cylinders 18, 19 respectively allow the rotations of the motor shafts of the front-wheel travel motors 16, 16 and the rear-wheel travel motors 17, 17, namely the rotations of the front wheels 12, 12 and the rear wheels 13, 13. Then, the controller 50 outputs command signals corresponding to the forward or reverse traveling signal to the front-wheel traveling control valve V1 and the rear-wheel traveling control valve V2 to supply the hydraulic fluid to the front-wheel travel motors 16, 16 and the rear-wheel travel motors 17, 17, thereby driving the front-wheel travel motors 16, 16 and the rear-wheel travel motors 17, 17 into rotation in a rotating direction and at a rotation speed corresponding to the forward or reverse traveling signal to cause the traveling body 10 to travel forward or in reverse.

Figure 5:
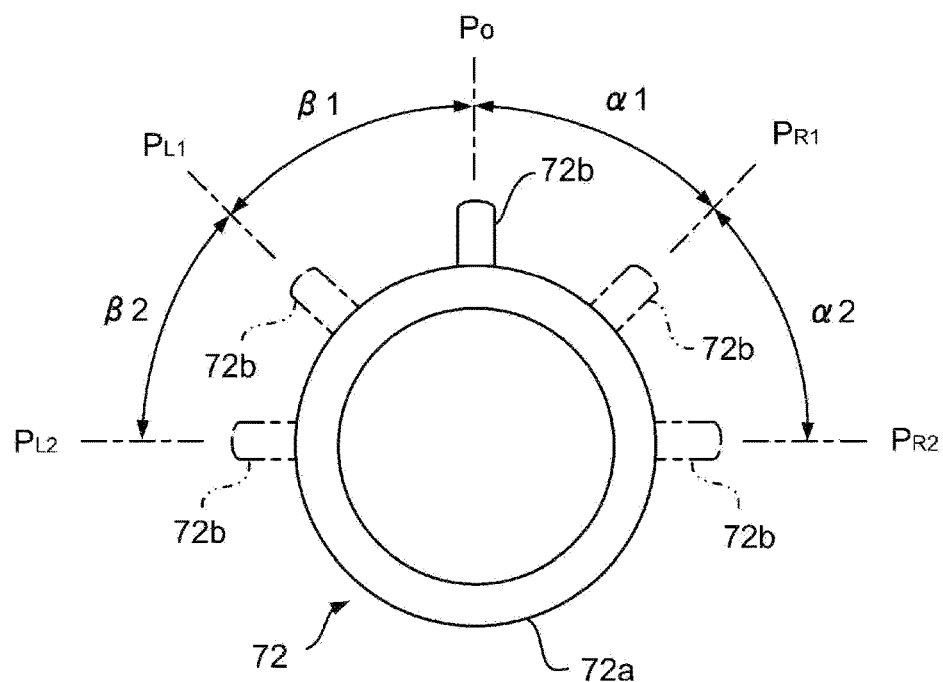
FIG. 5 is a schematic diagram illustrating a steering dial configuration of the vehicle with an aerial work platform.

The steering dial 72, as shown in FIG. 5, is provided with a rotatable circular dial base portion 72a and a stick-like rotational position pointing portion 72b provided in an outward projecting manner at a position on an outer edge of the dial base portion 72a. This steering dial 72 is configured to be operable to twist by about 90 degrees both right-handedly (clockwise) and left-handedly (counterclockwise) relative to the neutral position in which the rotational position pointing portion 72b is oriented to a predetermined reference position $P_0$, and outputs to the controller 50 an operation signal for setting target steering angles of the front wheels 12, 12 and the rear wheels 13, 13 according to a twisting operation direction and an operation amount from the reference position $P_0$. A right-handed twisting operation of the steering dial 72 is equivalent to a steering signal for changing the traveling direction of the traveling body 10 to a rightward direction, a left-handed twisting operation thereof is equivalent to a steering signal for changing the traveling direction of the traveling body 10 to a leftward direction, and a returning operation to the neutral position thereof is equivalent to a steering signal for changing the traveling direction of the traveling body 10 to a straightforward direction (for reducing the steering angles of the front wheels 12, 12 and the rear wheels 13, 13 to zero).

More specifically, if the steering dial 72 is operated to twist right-handedly within an angular range $\alpha 1$ from the reference position $P_0$ to a right middle twisted position $P_{R1}$ (see FIG. 5), a steering signal for setting a target steering angle for turning only the front wheels 12, 12 rightward according to the operation amount is outputted to the controller 50. In particular, if the steering dial 72 is operated to twist right-handedly until the rotational position pointing portion 72b of the steering dial 72 is oriented to the right middle twisted position $P_{R1}$, a steering signal for setting a target steering angle for maximizing rightward steering angles of the front wheels 12, 12 is outputted to the controller 50. In addition, if the steering dial 72 is operated to twist right-handedly within an angular range $\alpha 2$ from the right middle twisted position $P_{R1}$ to a maximum right twisted position $P_{R2}$, a steering signal for setting a target steering angle for turning only the rear wheels 13, 13 leftward (in a direction opposite to the rightward direction in which the front wheels 12, 12 are turned) according to the operation amount is outputted to the controller 50. In particular, if the steering dial 72 is operated to twist right-handedly until the rotational position pointing portion 72b of the steering dial 72 is oriented to the maximum right twisted position $P_{R2}$, a steering signal for setting a target steering angle for maximizing leftward steering angles of the rear wheels 13, 13 is outputted to the controller 50.

Similarly, if the steering dial 72 is operated to twist left-handedly within an angular range $\beta 1$ from the reference position $P_0$ to a left middle twisted position $P_{L1}$, a steering signal for setting a target steering angle for turning only the front wheels 12, 12 leftward according to the operation amount is outputted to the controller 50. In particular, if the steering dial 72 is operated to twist left-handedly until the rotational position pointing portion 72b of the steering dial 72 is oriented to the left middle twisted position $P_{L1}$, a steering signal for setting a target steering angle for maximizing leftward steering angles of the front wheels 12, 12 is outputted to the controller 50. In addition, if the steering dial 72 is operated to twist left-handedly within an angular range $\beta 2$ from the left middle twisted position $P_{L1}$ to a maximum left twisted position $P_{L2}$, a steering signal for setting a target steering angle for turning only the rear wheels 13, 13 rightward (in a direction opposite to the leftward direction in which the front wheels 12, 12 are turned) according to the operation amount is outputted to the controller 50. In particular, if the steering dial 72 is operated to twist left-handedly until the rotational position pointing portion 72b of the steering dial 72 is oriented to the maximum left twisted position $P_{L2}$, a steering signal for setting a target steering angle for maximizing rightward steering angles of the rear wheels 13, 13 is outputted to the controller 50.

If a steering signal is inputted from the steering dial 72 into the controller 50 under the condition that the forward or reverse traveling signal is inputted by a tilting operation of the traveling operation lever 71 and therefore brake actuation by the front-wheel brake cylinders 18, 18 and the rear-wheel brake cylinders 19, 19 is released, the controller 50 allows actuation of the steering device 90, and outputs command signals corresponding to the steering signal to the front-wheel steering control valve V3 and the rear-wheel steering control valve V4 to actuate the front-wheel steering cylinder 92 and the rear-wheel steering cylinder 94 to actuate the front wheels 12, 12 and the rear wheels 13, 13 to turn so that the steering angles detected by the front-wheel and rear-wheel steering angle detectors 96, 97 will be target steering angles corresponding to the steering signal.

Figure 6:
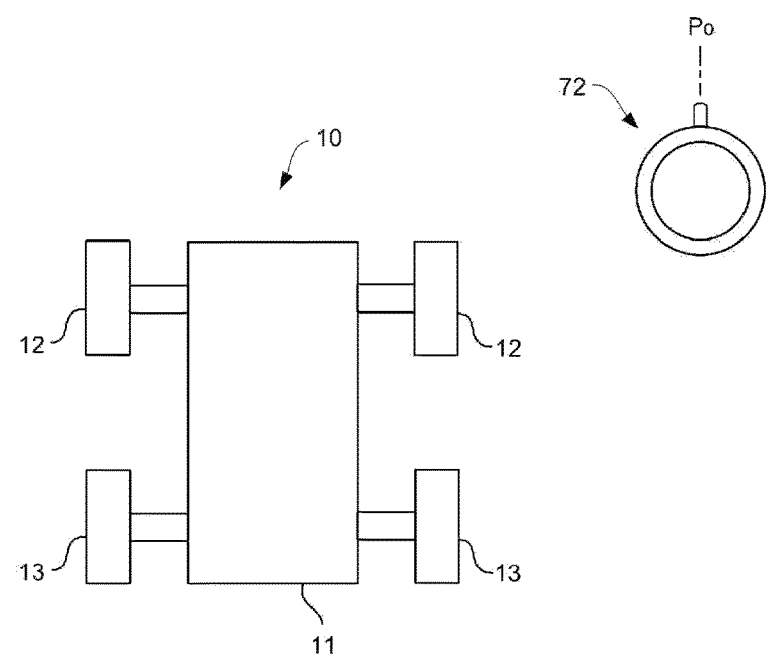
FIG. 6 is a schematic diagram illustrating a steering control example with the steering dial operated to a reference position.

Next, a specific example of steering control of the vehicle with an aerial work platform 1 (traveling body 10) will be described with additional reference to FIGS. 6 to 8. Steering control to cause the traveling body 10 to travel right-handedly will be described here by way of example. FIG. 6 shows the steering dial 72 operated to the reference position $P_0$ and the front wheels 12, 12 and the rear wheels 13, 13 thus situated in the neutral position (a position where the steering angle is zero). At this time, a steering signal of the front wheels 12, 12 and the rear wheels 13, 13 is not outputted from the steering dial 72 to the controller 50, and therefore the front-wheel steering cylinder 92 and the rear-wheel steering cylinder 94 are not actuated, so that the front wheels 12, 12 and the rear wheels 13, 13 are retained in the neutral position (a position where the respective steering angles detected by the front-wheel and rear-wheel steering angle detectors 96, 97 are zero (for example, $\theta_0=0°\pm0.5°$).

Figure 7:
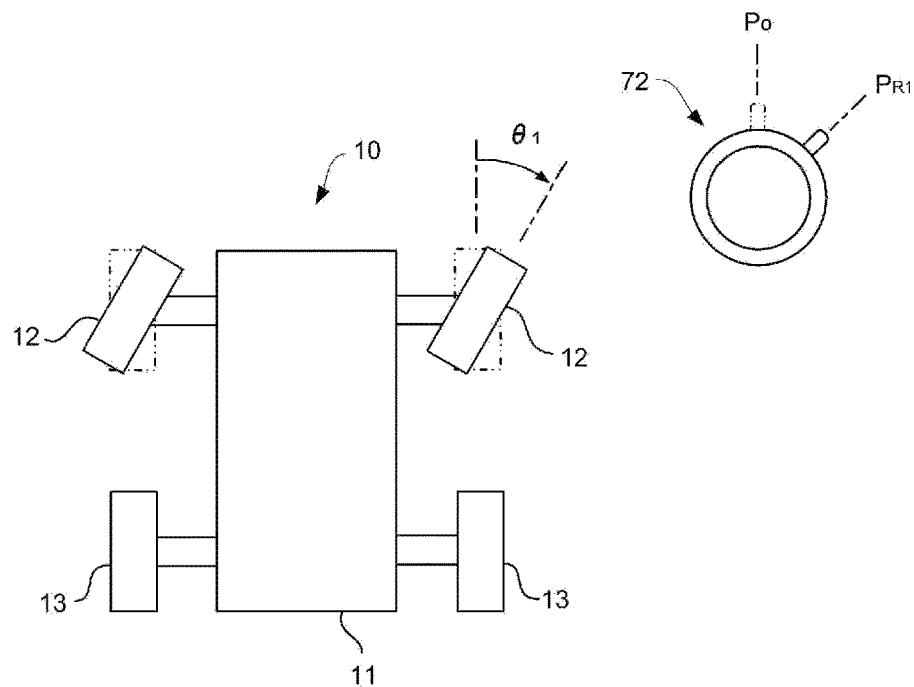
FIG. 7 is a schematic diagram illustrating a steering control example with the steering dial operated to a right middle twisted position.

FIG. 7 shows the steering dial 72 operated to the right middle twisted position $P_{R1}$. If the steering dial 72 is operated to twist right-handedly from the reference position $P_0$ toward the right middle twisted position $P_{R1}$, a steering signal for setting a target steering angle (an angle less than a maximum steering angle $\theta_1$ described later) for turning only the front wheels 12, 12 rightward according to the operation amount is outputted to the controller 50. Once this steering signal is inputted into the controller 50, the controller 50 outputs a command signal corresponding to this steering signal to the front-wheel steering control valve V3 to actuate the front-wheel steering cylinder 92 to actuate the front wheels 12, 12 to turn rightward so that the steering angles of the front wheels 12, 12 detected by the front-wheel steering angle detector 96 will be the target steering angle corresponding to the operation amount of the steering dial 72. At this time, a steering signal for steering the rear wheels 13, 13 is not outputted from the steering dial 72 to the controller 50, and therefore the rear-wheel steering cylinder 94 is not actuated, so that the rear wheels 13, 13 are retained in the neutral position.

As shown in FIG. 7, if the steering dial 72 is operated to the right middle twisted position $P_{R1}$, a steering signal for setting a target steering angle (an angle equal to the maximum steering angle $\theta_1$ described later) for turning only the front wheels 12, 12 rightward to a maximum degree is outputted to the controller 50. Once this steering signal is inputted into the controller 50, the controller 50 outputs a command signal corresponding to this steering signal to the front-wheel steering control valve V3 to actuate the front-wheel steering cylinder 92 to actuate the front wheels 12, 12 to turn rightward so that the rightward steering angles of the front wheels 12, 12 detected by the front-wheel steering angle detector 96 will be the maximum steering angle (for example, $\theta_0=30°\pm0.5°$). At this time, similarly, a steering signal for steering the rear wheels 13, 13 is not outputted from the steering dial 72 to the controller 50, and therefore the rear-wheel steering cylinder 94 is not actuated, so that the rear wheels 13, 13 are retained in the neutral position.

Figure 8:
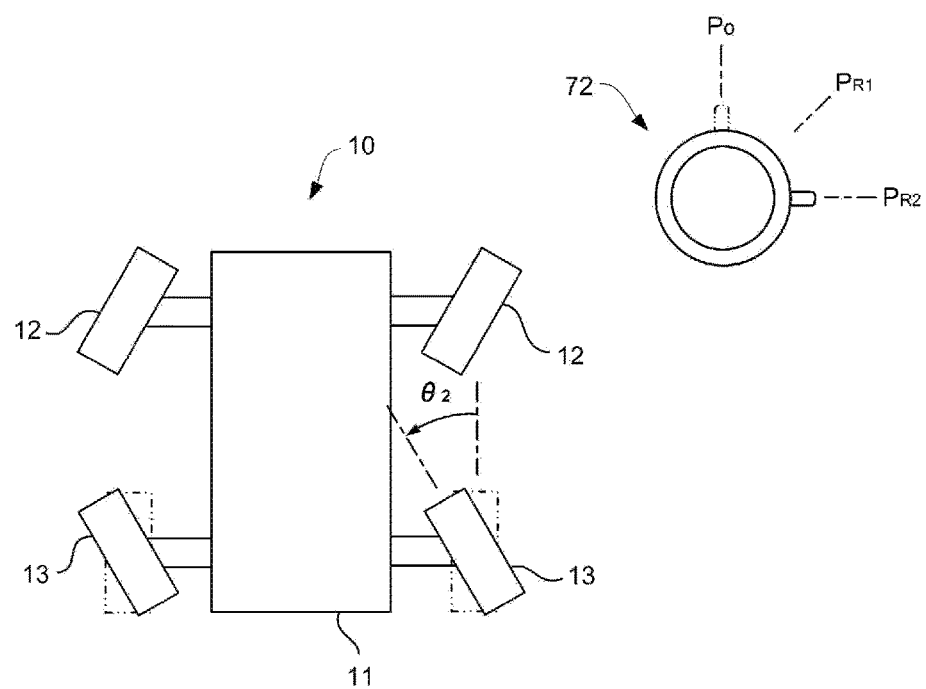
FIG. 8 is a schematic diagram illustrating a steering control example with the steering dial operated to a maximum right twisted position.

FIG. 8 shows the steering dial 72 operated to the maximum right twisted position $P_{R2}$. If the steering dial 72 is further operated to twist right-handedly from the right middle twisted position $P_{R1}$ toward the maximum right twisted position $P_{R2}$, a steering signal for setting a target steering angle (an angle less than maximum steering angle $\theta_2$ described later) for turning only the rear wheels 13, 13 leftward according to the operation amount is outputted to the controller 50. Once this steering signal is inputted into the controller 50, the controller 50 determines whether the steering angles of the front wheels 12, 12 detected by the front-wheel steering angle detector 96 are the maximum steering angle $\theta_1$ or not. Then, if the steering angles of the front wheels 12, 12 are the maximum steering angle $\theta_1$, then the controller 50 outputs a command signal corresponding to this steering signal to the rear-wheel steering control valve V4 to actuate the rear-wheel steering cylinder 94 to actuate the rear wheels 13, 13 to turn leftward so that the steering angles detected by the rear-wheel steering angle detector 97 will be the target steering angle corresponding to the operation amount of the steering dial 72. It should be noted that if the steering angles of the front wheels 12, 12 are the maximum steering angle $\theta_1$, a steering signal of the front wheels 12, 12 is not outputted from the steering dial 72 to the controller 50, so that the front-wheel steering control valve V3 is retained in neutral. Therefore, the front-wheel steering cylinder 92 is not actuated, so that the front wheels 12, 12 are retained in a rightward maximum steering angle position.

As shown in FIG. 8, if the steering dial 72 is operated to the maximum right twisted position $P_{R2}$, a steering signal for setting a target steering angle (an angle equal to the maximum steering angle $\theta_2$ described later) for turning only the rear wheels 13, 13 leftward to a maximum degree is outputted to the controller 50. Once this steering signal is inputted into the controller 50, the controller 50 outputs a command signal corresponding to this steering signal to the rear-wheel steering control valve V4 to actuate the rear-wheel steering cylinder 94 to actuate the rear wheels 13, 13 to turn leftward so that the leftward steering angles of the rear wheels 13, 13 detected by the rear-wheel steering angle detector 97 will be the maximum steering angle (for example, $\theta_2=30°\pm0.5°$). At this time, similarly, a steering signal of the front wheels 12, 12 is not outputted from the steering dial 72 to the controller 50, so that the front-wheel steering control valve V3 is retained in neutral. Therefore, the front-wheel steering cylinder 92 is not actuated, so that the front wheels 12, 12 are retained in the rightward maximum steering angle position.

If the steering dial 72 operated to the maximum right twisted position $P_{R2}$ is operated to return left-handedly from the maximum right twisted position $P_{R2}$ toward the right middle twisted position $P_{R1}$, a steering signal for setting a target steering angle for turning only the rear wheels 13, 13 rightward toward the neutral position according to the operation amount (operation position) is outputted to the controller 50. Once this steering signal is inputted into the controller 50, the controller 50 outputs a command signal corresponding to this steering signal to the rear-wheel steering control valve V4 to actuate the rear-wheel steering cylinder 94 to actuate the rear wheels 13, 13 to turn rightward so that the leftward steering angles of the rear wheels 13, 13 detected by the rear-wheel steering angle detector 97 will be the target steering angle corresponding to the operation amount of the steering dial 72. At this time, similarly, a steering signal of the front wheels 12, 12 is not outputted, from the steering dial 72 to the controller 50, so that the front-wheel steering control valve V3 is retained in neutral. Therefore, the front-wheel steering cylinder 92 is not actuated, so that the front wheels 12, 12 are retained in the rightward maximum steering angle position.

If the steering dial 72 is further operated to return left-handedly to the right middle twisted position $P_{R1}$, a steering signal for setting a target steering angle for turning only the rear wheels 13, 13 to the neutral position is outputted to the controller 50. Once this steering signal is inputted into the controller 50, the controller 50 outputs a command signal corresponding to this steering signal to the rear-wheel steering control valve V4 to actuate the rear-wheel steering cylinder 94 to actuate the rear wheels 13, 13 to turn to the neutral position so that the steering angles of the rear wheels 13, 13 detected by the rear-wheel steering angle detector 97 will be $\theta_0$. At this time, similarly, a steering signal of the front wheels 12, 12 is not outputted, from the steering dial 72 to the controller 50, so that the front-wheel steering control valve V3 is retained in neutral. Therefore, the front-wheel steering cylinder 92 is not actuated, so that the front wheels 12, 12 are retained in the rightward maximum steering angle position.

If the steering dial 72 is further operated to return left-handedly from the right middle twisted position $P_{R1}$ toward the reference position $P_0$, a steering signal for setting a target steering angle for turning only the front wheels 12, 12 leftward toward the neutral position according to the operation amount is outputted to the controller 50. Once this steering signal is inputted into the controller 50, the controller 50 determines whether the steering angles of the rear wheels 13, 13 detected by the rear-wheel steering angle detector 97 is zero ($\theta_0$) or not. If the steering angles of the rear wheels 13, 13 are zero ($\theta_0$), then the controller 50 outputs a command signal corresponding to this steering signal to the front-wheel steering control valve V3 to actuate the front-wheel steering cylinder 92 to actuate the front wheels 12, 12 to turn leftward so that the steering angles of the front wheels 12, 12 detected by the front-wheel steering angle detector 96 will be the target steering angle corresponding to the operation amount of the steering dial 72. It should be noted that if the steering angles of the rear wheels 13, 13 are zero ($\theta_0$), a steering signal of the rear wheels 13, 13 is not outputted from the steering dial 72 to the controller 50, so that the rear-wheel steering control valve V4 is retained in neutral. Therefore, the rear-wheel steering cylinder 94 is not actuated, so that the rear wheels 13, 13 are retained in the neutral position.

If the steering dial 72 is further operated to return left-handedly to the reference position $P_0$, a steering signal for setting the target steering angles of the front wheels 12, 12 to zero is outputted to the controller 50. Once this steering signal is inputted into the controller 50, the controller 50 outputs a command signal corresponding to this steering signal to the front-wheel steering control valve V3 to actuate the front-wheel steering cylinder 92 to turn the front wheels 12, 12 to the neutral position so that the respective steering angles detected by the front-wheel steering angle detector 96 will be zero ($\theta_0$). At this time, similarly, steering signal of the rear wheels 13, 13 is not outputted, to the controller 50, so that the rear-wheel steering control valve V4 is retained in neutral. Therefore, the rear-wheel steering cylinder 94 is not actuated, so that the rear wheels 13, 13 are retained in the neutral position.

The steering control of the front wheels 12, 12 and the rear wheels 13, 13 has been described above in the respective cases where the steering dial 72 is operated to twist right-handedly from the reference position $P_0$ to the maximum right twisted position $P_{R2}$ and where the steering dial 72 is operated to return left-handedly from the maximum right twisted position $P_{R2}$ to the reference position $P_0$. Steering control of the front wheels 12, 12 and the rear wheels 13, 13 in the case where the steering dial 72 is operated to twist left-handedly from the reference position $P_0$ to the maximum left twisted position $P_{L2}$ and in the case where the steering dial 72 is operated to return right-handedly from the maximum left twisted position $P_{L2}$ to the reference position $P_0$ has the same basic content as the steering control described above except that the steering directions of the front wheels 12, 12 and the rear wheels 13, 13 are laterally reversed.

As described above, in accordance with the steering control apparatus of the vehicle with an aerial work platform 1, the steering mode where only the front wheels 12, 12 are turned between the neutral position and the maximum steering angle position with the rear wheels 13, 13 retained in the neutral position and the steering mode where only the rear wheels 13, 13 are turned between the neutral position and the maximum steering angle position with the front wheels 12, 12 retained in the maximum steering angle position can be switched by only operating the steering dial 72 according to an operation amount thereof. This also enables the turning radius of the vehicle with an aerial work platform 1 (traveling body 10) during traveling to be continuously varied from a maximum turning radius to a minimum turning radius by only operating the steering dial 72. Therefore, the vehicle with an aerial work platform 1 has much better operability during steering than a vehicle with an aerial work platform configured to switch between the two-wheel steering mode and the four-wheel steering mode selectively by a selector switch or the like.

A preferred embodiment according to the present invention has been described above, but the scope of the present invention is not limited to a scope shown in the embodiment described above. For example, in the embodiment described above, when the front wheels 12, 12 and the rear wheels 13, 13 are actuated to turn from the neutral position, only the front wheels 12, 12 are actuated to turn if the steering angles of the front wheels 12, 12 are less than the maximum steering angle $\theta_1$, and only the rear wheels 13, 13 are actuated to turn if the steering angles of the front wheels 12, 12 are the maximum steering angle $\theta_1$, but the scope of the present invention is not limited thereto. The present invention may be configured in a manner such that when the front wheels 12, 12 and the rear wheels 13, 13 are actuated to turn from the neutral position, only the front wheels 12, 12 are actuated to turn if the steering angles of the front wheels 12, 12 are less than a predetermined angle $\theta_3$ ($\theta_0<\theta_3<\theta_1$), the rear wheels 13, 13 are also actuated to turn in addition to the front wheels 12, 12 but in the opposite direction to the front wheels 12, 12 if the steering angles of the front wheels 12, 12 lie within an angular range from equal to or more than $\theta_3$ to less than $\theta_1$, and only the rear wheels 13, 13 are actuated to turn if the steering angles of the front wheels 12, 12 reach the maximum steering angle $\theta_1$.

In addition, in the embodiment described above, when the front wheels 12, 12 and the rear wheels 13, 13 are actuated to turn back from the maximum steering angle position to the neutral position, only the rear wheels 13, 13 are actuated to turn if the steering angles of the rear wheels 13, 13 are equal to or less than $\theta_2$ and larger than $\theta_0$, and only the front wheels 12, 12 are actuated to turn if the steering angles of the rear wheels 13, 13 reach $\theta_0$, but the scope of the present invention is not limited thereto. The present invention may be configured in a manner such that when the front wheels 12, 12 and the rear wheels 13, 13 are actuated to turn back from the maximum steering angle position to the neutral position, only the rear wheels 13, 13 are actuated to turn if the steering angles of the rear wheels 13, 13 are equal to or more than a predetermined angle $\theta_4$ ($\theta_0<\theta_4<\theta_2$), the front wheels 12, 12 are also actuated to turn in addition to the rear wheels 13, 13 but in the opposite direction to the rear wheels 13, 13 if the steering angles of the rear wheels 13, 13 are less than $\theta_4$ and larger than $\theta_0$, and only the front wheels 12, 12 are actuated to turn if the steering angles of the rear wheels 13, 13 reach $\theta_0$.

Figure 9:
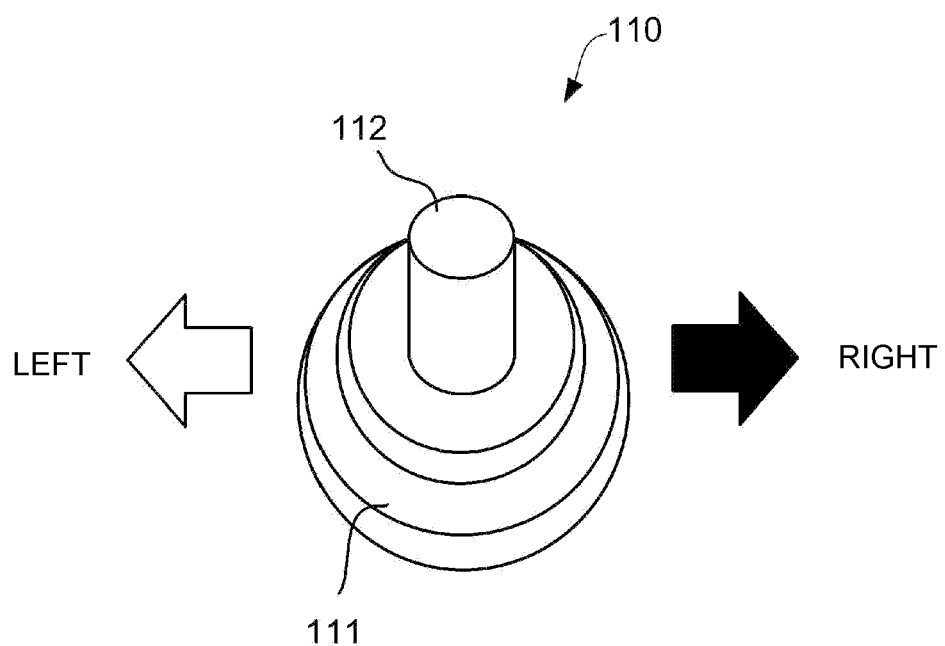
FIG. 9 is a schematic diagram illustrating a steering switch lever configuration usable as an alternative to the steering dial.

In addition, the above embodiment has been described as being configured to be provided with the steering dial 72 as a steering operating means, but the present invention may be configured to be provided with a steering switch lever 110 such as shown in FIG. 9 instead of the steering dial 72. This steering switch lever 110 includes a base portion 111 and a stick-like operating portion 112 provided in an upward projecting manner on the base portion 111. The operating portion 112 is configured to be tiltable leftward and rightward, and a steering signal for changing the traveling direction of the vehicle to the leftward direction is outputted if the operating portion 112 is tilted leftward, whereas a steering signal for changing the traveling direction of the vehicle to the rightward direction is outputted if the operating portion 112 is tilted rightward. It should be noted that the steering switch lever 110 is different from the steering dial 72 in that a steering signal for returning the wheels to the neutral position is not outputted when the operating portion 112 is returned to the neutral position.

In addition, the steering angles of the front wheels 12, 12 are directly detected by the front-wheel steering angle detector 96 in the embodiment described above, but the steering angles of the front wheels 12, 12 may be indirectly detected on the basis of a detection result of a stroke of the front-wheel steering cylinder 92 detected by a limit switch, a sensor, or the like. Similarly, the steering angles of the rear wheels 13, 13 are directly detected by the rear-wheel steering angle detector 97 in the embodiment described above, but the steering angles of the rear wheels 13, 13 may be indirectly detected on the basis of a detection result of a stroke of the rear-wheel steering cylinder 94 detected by a limit switch, a sensor, or the like.

In addition, a limit switch for front wheels (not shown) for detecting that (whether or not) the steering angles of the front wheels 12, 12 reach the maximum steering angle may be provided in the front-wheel turning mechanism 93 instead of the front-wheel steering angle detector 96. In this case, when the front wheels 12, 12 and the rear wheels 13, 13 are actuated to turn from the neutral position, on the basis of a detection result from the limit switch for front wheels, only the front wheels 12, 12 may be actuated to turn if the steering angles of the front wheels 12, 12 are less than the maximum steering angle $\theta_1$ (does not reach $\theta_1$), and only the rear wheels 13, 13 may be actuated to turn if (after) the steering angles of the front wheels 12, 12 reach the maximum steering angle $\theta_1$. Similarly, a limit switch for rear wheels (not shown) for detecting that the steering angles of the rear wheels 13, 13 reach (return to) zero ($\theta_0$) may be provided in the rear-wheel turning mechanism 91 instead of the rear-wheel steering angle detector 97. In this case, when the front wheels 12, 12 and the rear wheels 13, 13 are actuated to turn back from the maximum steering angle position to the neutral position, on the basis of a detection result from the limit switch for rear wheels, only the rear wheels 13, 13 may be actuated to turn if the steering angles of the rear wheels 13, 13 are larger than $\theta_0$ (does not reach $\theta_0$, and only the front wheels 12, 12 may be actuated to turn if (after) the steering angles of the rear wheels 13, 13 reach $\theta_0$. It should be noted that another detection switch such as a proximity switch may be used instead of the limit switch. In addition, a four-wheel driving configuration having the front-wheel travel motors 16, 16 and the rear-wheel travel motors 17, 17 has been employed in the embodiment described above, but a two-wheel driving configuration where either the front wheels 12, 12 or the rear wheels 13, 13 are driven may be employed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This invention claims the benefit of Japanese Patent Application No. 2021-160393 which is hereby incorporated by reference.

EXPLANATION ABOUT NUMERALS AND CHARACTERS

1 Vehicle with aerial work platform
10 Traveling body
11 Traveling body frame
12 Front wheel
13 Rear wheel
16 Front traveling motor
17 Rear traveling motor
50 Controller
72 Steering dial
90 Steering device
92 Front-wheel steering cylinder
94 Rear-wheel steering cylinder
96 Front-wheel steering angle detector
97 Rear-wheel steering angle detector

The invention claimed is:
1. A work vehicle steering control apparatus comprising:
a vehicle body;
front wheels rotatably provided at left and right sides of front part of the vehicle body and rear wheels rotatably provided at left and right sides of rear part of the vehicle body, the front wheels and the rear wheels being able to be steered respectively;
a steering actuator which steers the front wheels and/or the rear wheels respectively and independently to turn the work vehicle;
a steering operation device which is operated by an operator to turn the work vehicle;
a steering actuation control device which controls for controlling actuation of the steering actuator based on operations of the steering operation device; and
a steering angle detector which detects steering angles of the front wheels and the rear wheels, wherein
when the steering operation device is operated, on the basis of a detection by the steering angle detector,
when a detected steering angle of one set of wheels of either the front wheels or the rear wheels is less than a predetermined angle and a detected steering angle of the other set of wheels is substantially zero, the steering actuation control device controls the steering actuator to steer only the one set of wheels to turn the work vehicle in response to operation of the steering operation device and to keep the other set of wheels being substantially zero, and
when the steering angles of the one set of wheels are equal to or more than the predetermined angle, the steering actuation control device controls the steering actuator to steer the other set of wheels in a direction opposite to steering direction of the one set of wheels in response to operation of the steering operation device without steering the one set of wheels.

2. The work vehicle steering control apparatus according to claim 1, wherein the predetermined angle is a maximum steering angle of the one set of wheels.

3. The work vehicle steering control apparatus according to claim 2, wherein the steering angle detector comprises a detection switch which detects that the steering angles of the one set of wheels reach the maximum steering angle.

4. The work vehicle steering control apparatus according to claim 1, wherein
when a return steering operation for turning the front wheels and the rear wheels toward a neutral position is performed by the steering operation device after the directional-change steering operation is performed by the steering operation device,
on the basis of a detection result from the steering angle detector,
when the steering angles of the other set of wheels do not reach a steering angle of being substantially zero, the steering actuation control device controls the steering actuator to actuate only the other set of wheels to turn in response to the return steering operation, and
when the steering angles of the other set of wheels reach the steering angle of being substantially zero, the steering actuation control device controls the steering actuator to actuate only the one set of wheels to turn in a direction opposite to the other set of wheels while retaining the other set of wheels of being substantially zero in response to the return steering operation.

5. A work vehicle steering control apparatus comprising:
a vehicle body;
front wheels rotatably provided at left and right sides of front part of the vehicle body and rear wheels rotatably provided at left and right sides of rear part of the vehicle body, the front wheels and the rear wheels being able to be steered respectively;
a steering actuator which steers the front wheels and the rear wheels respectively and independently to turn the work vehicle;
a steering operation device which is operated by an operator to turn the work vehicle;

a steering actuation control device which controls actuation of the steering actuator based on operations of the steering operation device by an operator; and a steering angle detector which detects steering angles of the front wheels and the rear wheels, wherein when the steering operation device is operated, according to an operation amount of the steering device and to steering angles of the front wheels and the rear wheels detected by the steering angle detector, a first steering mode and a second steering mode are used selectively, in the first steering mode, only one set of wheels of either the front wheels or the rear wheels are steered between a substantially zero steering angle position and a maximum steering angle position with the other set of wheels retained in a substantially zero steering angle position and in the second steering mode, only the other set of wheels are steered in a direction opposite to steering direction of the one set of wheels between a substantially zero steering angle position and a maximum steering angle position with the one set of wheels retained in the maximum steering angle position.

\* \* \* \* \*